United States Patent [19]
Kirila, II et al.

[11] Patent Number: 5,251,947
[45] Date of Patent: Oct. 12, 1993

[54] CHAIN BOX

[76] Inventors: Gene E. Kirila, II, 7291 Oakwood Dr., Brookfield, Ohio 44403; James S. Lapikas, 3554 Saranac Dr., Sharpsville, Pa. 16150

[21] Appl. No.: 942,452

[22] Filed: Sep. 9, 1992

[51] Int. Cl.⁵ .............................................. B60R 9/02
[52] U.S. Cl. ................................ 296/37.6; 224/42.41; 410/50; 410/97; 280/769
[58] Field of Search ............................. 296/37.1, 37.6; 224/42.41, 42.43; 152/215; 410/47, 49, 50, 10, 11, 23, 97, 100, 112-114; 280/769

[56] References Cited

U.S. PATENT DOCUMENTS

| 1,245,219 | 11/1917 | Haberstick | 152/215 |
| 1,374,556 | 4/1921 | Dunn | 242/86.5 R |
| 1,463,994 | 8/1923 | Fishleigh | 296/37.1 X |
| 1,466,374 | 8/1923 | Hart | 242/107.6 |
| 1,780,834 | 11/1930 | Moore | 152/215 |
| 3,240,408 | 3/1966 | Lapansie | 224/42.41 |
| 3,740,073 | 6/1973 | Schwigbert | 410/47 |
| 3,854,424 | 12/1974 | Blunden et al. | 410/11 |
| 4,705,315 | 11/1987 | Cherry | 296/37.6 X |
| 4,889,377 | 12/1989 | Hughes | 296/37.6 X |
| 4,938,398 | 7/1990 | Hallsen | 224/42.42 |
| 4,948,169 | 8/1990 | Amundson | 280/769 |

Primary Examiner—Dennis H. Pedder
Attorney, Agent, or Firm—Dennison, Meserole, Pollack & Scheiner

[57] ABSTRACT

A chain box mountable beneath a load bed adjacent to one edge thereof. The chain box includes a upwardly opening mouth and an interior rearwardly tapering internal chamber which receives a chain through the open mouth and rearwardly moves and inwardly stacks the chain. The free end of the chain engages the box at the mouth for withdrawal of the chain.

12 Claims, 2 Drawing Sheets

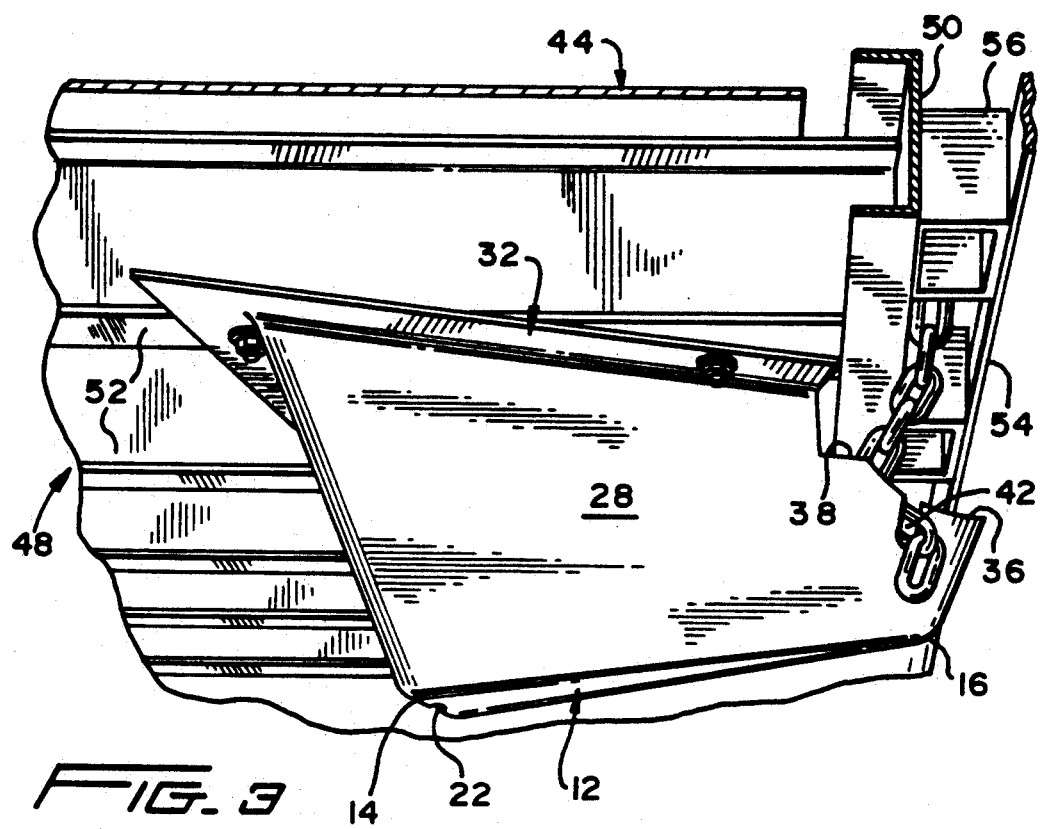
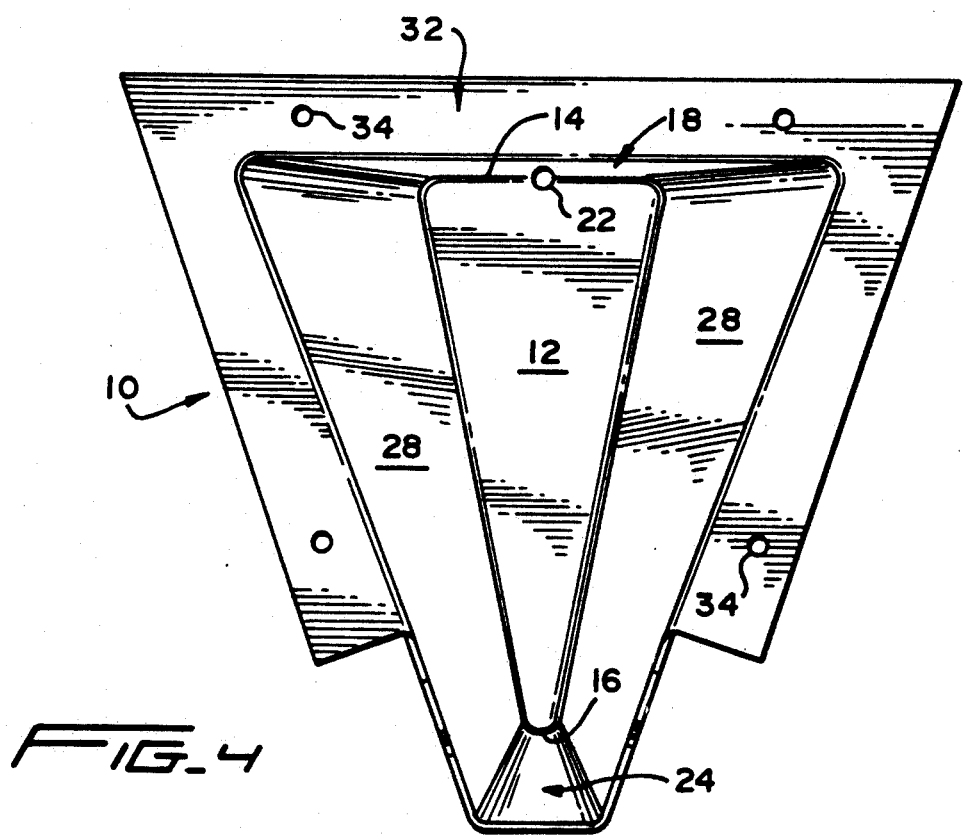

CHAIN BOX

BACKGROUND OF THE INVENTION

Flatbed trailers, trucks, and the like, particularly if intended for hauling steel, are conventionally provided with hold down chains at space points along the length of the load bed.

The individual chains will normally have one end welded or otherwise affixed to the bed frame, for example the side rail, with the opposite chain end provided with appropriate hook means for engagement with the opposite side edge of the bed to secure the load.

The welding of one end of each of the chains is desirable as a means to prevent loss of the chains, either accidentally or by theft. Also, the permanent securing of one end of the chains facilitates and expedites the positioning of the chains about a bed-received load.

While the welding of the chains to the trailer bed prevents loss of the chains, problems arise as to the storage of loose chains, that is chains not actually employed in the securing of a load. Such an unsecured chain will frequently merely be loosely thrown on the trailer bed, wrapped and hooked about the bed frame or side tiedown bar, or otherwise retained as considered best by the truck personnel.

The rather haphazard storage of hold-down chains gives rise to several problems which can result in inconveniences, broken chains and even safety problems. For example, it is not unknown for loose chains to fall from and trail behind the trailer. This will not only tend to damage the chain, but can also in itself produce a substantial safety hazard.

In addition, a wrapping of the chain about the frame or a component thereof, particularly wherein this is done to the whims of the individual truck personnel, frequently interferes with the efficiency with which the chain can be retrieved for use.

SUMMARY OF THE INVENTION

The present invention is a storage means for a load hold-down chain which receives the loose chain and automatically compacts the chain into a neatly folded bundle completely contained and retained below the trailer bed adjacent to a longitudinal side thereof.

The chain is stored against accidental discharge in a substantially completely concealed position without encumbering the load bed, and with the chain conveniently and easily available for the withdrawal from the storage means when use of the chain is required.

The storage system of the invention basically consists of a uniquely configured chain storage box, as well as the positional relationship of the box to a trailer bed. The box is preferably formed of a high strength rigid fiber glass reinforced plastic resin capable of forming a weatherproof enclosure for the chain.

The box includes a flat triangular bottom or bottom wall with the base edge at the rear of the box. Peripheral walls extend upward from the bottom with the front wall, generally in the shape of an inverted triangle, being of a height substantially less than that of the rear wall. The rear wall and a major portion of each of the opposed side walls forward from the rear wall have a continuous coplanar laterally outwardly directed mounting flange along the upper edges thereof. The plane of the flange is at an angle to the plane of the bottom and inclined upward from the low front wall to the higher rear wall, the height of the side walls increasing rearward from the front wall. The side walls also converge forwardly toward the narrower front wall and have forward portions downwardly stepped from the flanged upper edge portions thereof to join the lower wall, thus forming an upwardly opening mouth to the box forward of the mounting flange.

The four walls of the box slightly outwardly incline upward from the bottom. The mounting flange is adapted to bolt directly to an overlying support such as the under surface of a trailer bed framework, preferably the cross members, with the upwardly directed mouth at the narrow end of the box positioned partially outward and below the side rail for easy access thereto. The box, so mounted, has the bottom wall downwardly and rearwardly inclined which, in conjunction with the inclined sidewalls, tends to inwardly move and neatly stack an introduced length of chain. The following end of the chain, either with or without a securing hook or other element thereon, can releasably latch to the upper edge of the mouth for convenient access thereto. The upwardly directed mouth, in conjunction with the general rearward and downward sloping of the interior chamber of the box, provides for an extremely convenient introduction of the loose chain into the box, with the chain, with minimum guiding, dropping freely into the box and sliding rearward into a stacked relationship within the box. The withdrawal of the chain is equally effective, requiring only a grasping and pulling of the free end of the chain.

Additional features of the invention will be appreciated from the more detailed description of the construction and manner of use of the invention as more fully hereinafter presented.

BRIEF DESCRIPTION OF THE DRAWINGS

FIG. 3 is a side view of the mounted box; and

FIG. 4 is a plan view of the box.

DESCRIPTION OF PREFERRED EMBODIMENT

Figure 1:
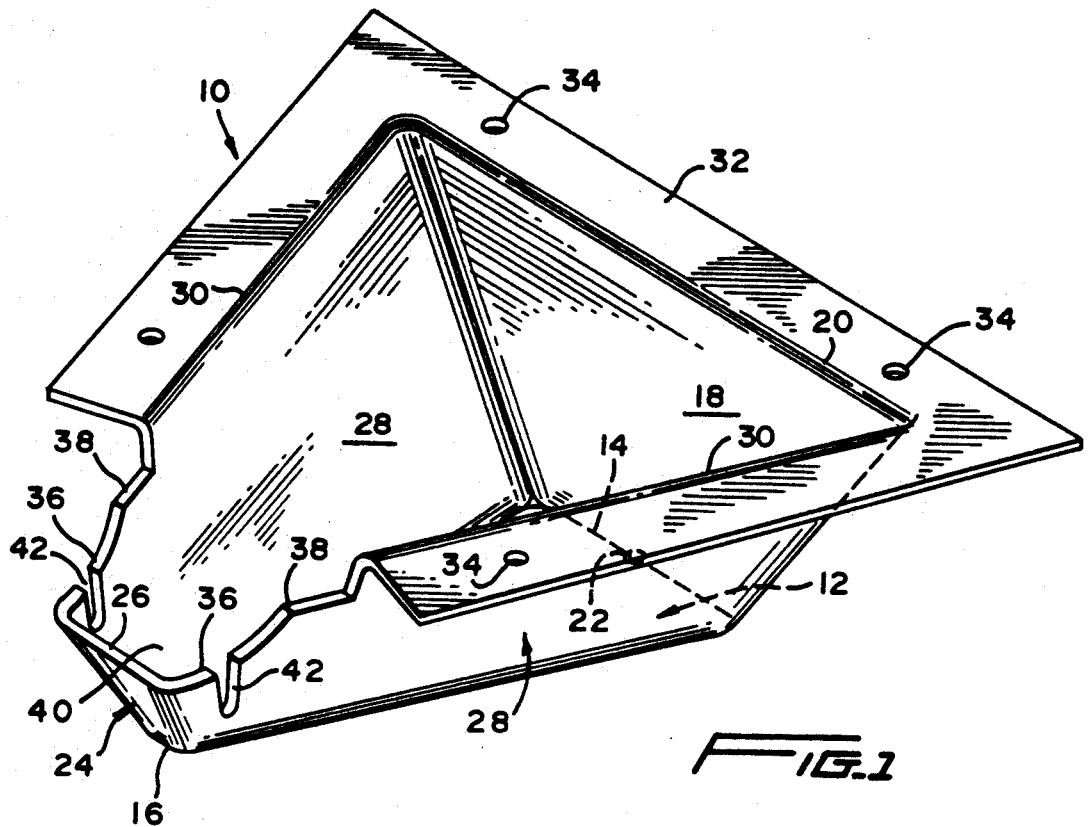
FIG. 1 is a perspective view of the chain box of the invention.

Referring now more specifically to the drawings, the chain box 10 is preferably molded as a single unit of an appropriate fiber glass reinforced synthetic resinous material providing a high strength, rigid and waterproof storage container. The box 10 comprises a flat substantially triangular bottom wall 12, the base edge of which defines the rear or inner edge 14 and the apex of which defines the front or outer edge 16.

A rear wall 18, integral with the rear edge 14 of the bottom extends upwardly therefrom at generally 90° thereto and is of basically an inverted truncated triangular configuration progressively increasing in width to the upper edge 20 thereof. A drain hole 22 is provided through the box bottom 12 adjacent the rear edge 14 and the rear wall 18.

The front wall 24, basically in the configuration of an inverted triangle, is integrally formed with the forward edge 16 of the bottom 12 and extends upward therefrom at a forward inclination relative thereto, for example at an obtuse angle of approximately 130° to the bottom. The front wall 24 is substantially shorter than the rear wall 18 and terminates in an upper edge 26.

A pair of opposed side walls 28 are integrally joined to and extend upward from the opposed side edges of the bottom 12, also at an outward inclination thereto which may be approximately that of the front wall 24. The side walls 28 are coextensive with the respective side edges of the bottom 12, converging toward the front wall 24 and integrally joined to the respective opposed edges of the rear wall 18 and front wall 24.

The side walls 28 are also of a decreasing height, relative to the bottom 12, from the rear wall 18 to the front wall 24 and, for a major portion of the lengths thereof from the rear wall 18, have upper edge lengths 30 coplanar with the rear wall upper edge 20. A planar outwardly extending mounting flange 32 is integrally formed with the opposed side wall upper edge lengths 30 and rear wall upper edge 20 continuously along the full extent thereof. The plane of flange 32 is at a forwardly and downwardly inclined angle relative to the plane of the bottom 12.

The mounting flange 32 includes preformed bolt-receiving mounting apertures 34 therethrough, preferably in front-to rear aligned pairs with one aperture 34 in the rear wall portion of the flange 32 and the other toward the forward end of the corresponding side wall flange portion.

The side walls 28 at the ends immediately inward of the outer or forward wall 24 are of generally equal height with the forward wall 24 and include forward upper edge lengths 36 generally coplanar with the upper edge 26 of the forward wall 24.

An intermediate side wall upper edge length 38 extends between the forward edge length 36 and the rear upper edge length 30 on each side wall 28 and can be either of generally equal height with the forward upper edge length 36 or upwardly inclined and stepped relative thereto. So configured, the front wall 24 and forward portions of the opposed side walls 28 define a forward upwardly opening mouth 40 downwardly stepped below the mounting plane of the box 10 defined by the planar mounting flange 32.

The box 10 is completed by the provision of a chain-retaining notch 42 extending downward in one or both sidewalls 28 through the corresponding forward upper edge length 36 rearward of the front wall 24. The notch 42 is preferably of a depth so as to completely receive a vertically oriented chain link therein, and of a width to preclude longitudinal passage of an adjacent horizontally oriented link as shall be discussed in more detail subsequently.

Figure 2:
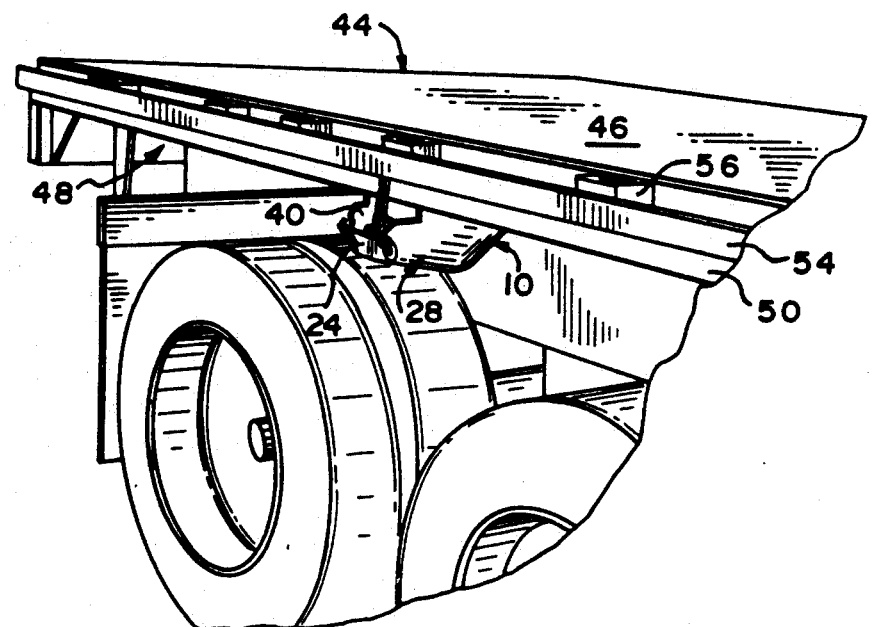
FIG. 2 is a perspective view of the box mounted to a trailer load receiving bed.

FIGS. 2 and 3 illustrate the mounting of a chain box 10 below a typical trailer load bed 44. The load bed will normally include an upper load-receiving deck 46 and a supporting frame 48 comprising longitudinally extending channel shaped side rails 50 and transversely extending cross members 52. A tiedown bar or rail 54 will parallel each side rail 50 and mount thereto by appropriate standoff brackets 56 to space the bar 54 from the side rail 50 and accommodate cain attachment.

The chain box will be positioned with the mounting flange 32 substantially horizontal and upwardly engaged against the under surface of the frame 48, and normally the lower flanges of a pair of adjacent cross members 52. The box 10 will be secured by appropriate fasteners, such as bolts engaged through the bolt holes 34 in the flange 32 and similar formed bolt holes within the cross members 52.

The box 10 will be so oriented relative to the side rail 50 as to position the downwardly offset and upwardly opening mouth 40 at least partially outward beyond the corresponding side rail 50, this positioning, in conjunction with the downward offsetting of the upper wall edges 26 and 36 which define the mouth 40, being such as to allow for free passage of the chain both into and out of the box 10.

For safety purposes, and to prevent possible damage to the relatively narrow forward portion of the box 10, it is contemplated that the front wall 24 of the box 10 preferably extend no further outward than the overlying and upwardly spaced tiedown bar 54.

Both ends of the chain, when not encircling a trailer bed load, can be free with the chain, other than for a leading end engaged within the notch 42, entirely received within the chain box 10. However, in a preferred arrangement, one end of the chain, the inner or trailing end thereof, will be welded or otherwise permanently or semi-permanently attached to or adjacent to the side rail 50 immediately above the mouth 40 of the corresponding box 10. The chain, upon release from its load-spanning position, can then be downwardly dropped from the secured inner end into the box trough the upwardly opening mouth 40 thereof until only the leading or outer end of the chain remains. This outer end, either with or without an appropriate securing hook thereon, will then be slipped into the notch 42 with the weight of the cain retaining the end portion within the notch until manually raised therefrom. Longitudinal sliding of the chain through the notch, either outward of or into the box 10 will be precluded by the relatively narrow width of the slot which accommodates a vertically positioned chain link while precluding lateral passage therethrough of an adjacent horizontal link or end hook.

As will be appreciated from FIG. 3 in particular, with the mounting flange 32 horizontally oriented to engage against the horizontal under surface of the frame cross members 52, the bottom 12 of the box slopes inward and downward toward the wider rear portion o the bottom. This, in conjunction with the downward and inward sloping peripheral walls insures a systematic and near folding and stacking of the introduced chain. This in turn facilitates withdrawal of the chain without twisting, kinking, or the like.

From the foregoing, it will be appreciated that the chain box of the invention provides for a unique means to compactly store, secure and protect a loose hold-down chain. The chain, while substantially completely concealed when stored, remains readily and easily accessible for removal from the stored position for use as a hold-down means in the conventional manner.

The foregoing is considered illustrative of the features of the invention and not as a limitation on the scope of the invention which is to encompass all obvious modifications or variations.

I claim:

1. For use in the storage of a hold-down chain beneath a load bed, a storage box with a chain-receiving interior, said box comprising a bottom, a rear wall projecting upward from said bottom, opposed laterally spaced side walls projecting upward and diverging relative to each other from said bottom, said side walls extending forward and converging relative to each other from said rear wall, said rear and side walls having upper edges, mounting means for securing said box to an overlying support, a front wall projecting upward from said bottom in forwardly spaced relation to said rear wall and extending between said side walls, said front wall being of a height upward from said bottom less than the height of said rear wall, each side wall having a rear portion whereat said side wall upper edge is at generally equal height and defines a common plane with said rear wall upper edge, each side wall having a forward portion whereat said side wall upper edge is of generally equal height with said front wall, said front wall and said forward portions of said side walls defining an upwardly opening mouth to said box interior, said bottom diverging downward relative to said plane of said rear wall upper edge from said front wall to said rear wall, and said bottom being progressively wider from said front wall to said rear wall.

2. The storage box of claim 1 wherein said mounting means includes a mounting flange extending along and projecting laterally outward from said upper edge of said rear wall and at least a portion of said upper edges of said side walls extending forward from said rear wall.

3. The storage box of claim 1 wherein said front wall is at an obtuse angle to said bottom.

4. The storage box of claim 3 wherein said rear wall extends substantially perpendicular to said bottom.

5. The storage box of claim 4 wherein at least one of said side walls in said forward portion thereof includes a chain-retaining upwardly opening notch defined in the upper edge thereof.

6. The storage box of claim 1 wherein at least one of said side walls in said forward portion thereof includes a chain-retaining upwardly opening notch defined in the upper edge thereof.

7. A storage box for chain in combination with a load bed having a load surface and an underlying framework including opposed longitudinal sides and an undersurface; said box being mounted to said undersurface and having an outer end portion outwardly directed relative to one of said longitudinal sides, and an inner end inward of said outer end portion, said outer end portion define an upwardly opening mouth at said corresponding longitudinal side, said box including a bottom between said outer end portion and said inner end, said bottom being inclined downward relative to said undersurface between said outer end portion and said inner end for reception and inward movement of chain introduced through said mouth, and wall means extending upward from said bottom to confine the chain within said box, said wall means comprises opposed outer and inner walls diverging upward from said bottom, and opposed side walls extending between said outer and inner walls and diverging upward from said bottom, said outer, inner and side walls defining a chain confining box interior, said bottom being progressively wider from said outer end portion to said inner end of said box.

8. The construction of claim 7 wherein said inner wall and said side walls inward of said outer end portion terminate in upper edge lengths, and mounting means at said upper edge lengths engaging said box with said framework undersurface.

9. The structure of claim 8 wherein said mounting means includes a laterally outwardly projecting flange integral with said upper edge lengths, and fastener means fixing said flanges to said framework.

10. The structure of claim 9 wherein said outer end portion is defined by said outer wall and forward portions of said side walls, said outer end portion including an upper edge downwardly offset relative to said framework undersurface and forming said mouth.

11. The structure of claim 10 including a chain-receiving notch defined in said outer end portion and opening upward through said upper edge of said outer end portion.

12. The structure of claim 7 wherein said outer end portion is defined by said outer wall and forward portions of said side walls, said outer end portion including an upper edge downwardly offset relative to said framework undersurface and forming said mouth.

* * * * *